No. 12,577. REISSUED DEC. 11, 1906.
W. N. DUNN.
SHADE ROLLER RAISING, LOWERING, AND SUPPORTING DEVICE.
APPLICATION FILED OCT. 31, 1906.
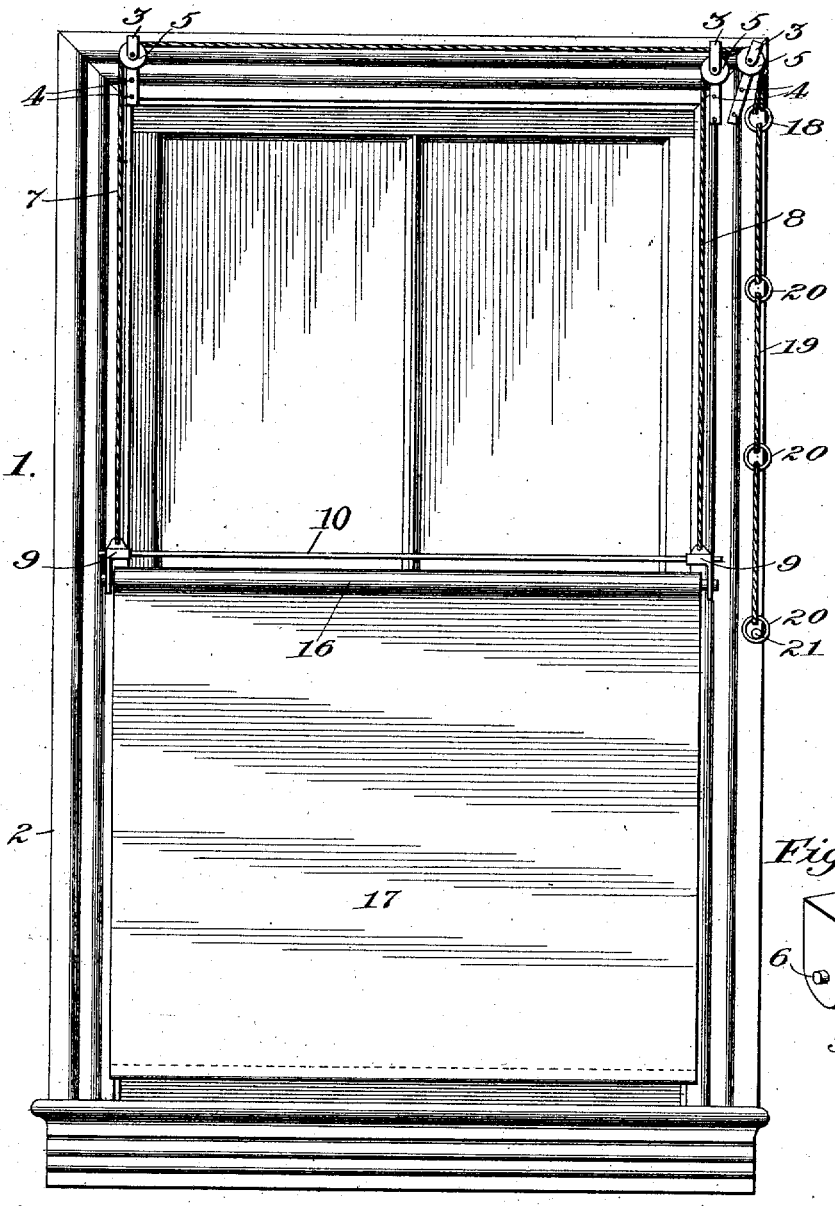
Fig. 1.
Fig. 4.
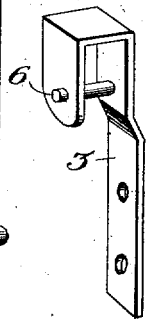
Fig. 2.
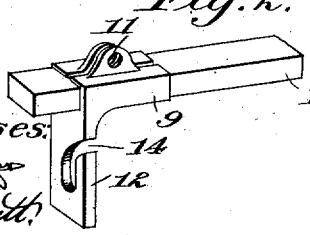
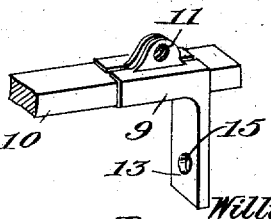
Fig. 3.
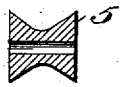
Witnesses:
W. B. Tegler
Robt. Smith.
Inventor:
William Nelson Dunn.
By James L. Norris. Atty.
THE NORRIS PETERS CO., WASHINGTON, D. C.

UNITED STATES PATENT OFFICE.

WILLIAM NELSON DUNN, OF MARTINSBURG, WEST VIRGINIA, ASSIGNOR OF ONE-HALF INTEREST TO CHARLES E. THOMPSON, OF MARTINSBURG, WEST VIRGINIA.

SHADE-ROLLER RAISING, LOWERING, AND SUPPORTING DEVICE.

No. 12,577. Specification of Reissued Letters Patent. Reissued Dec. 11, 1906.

Original No. 827,688, dated July 31, 1906. Application for reissue filed October 31, 1906. Serial No. 341,662.

*To all whom it may concern:*

Be it known that I, WILLIAM NELSON DUNN, a citizen of the United States, residing at Martinsburg, in the county of Berkeley and State of West Virginia, have invented certain new and useful Improvements in Appliances for Lowering and Raising and Holding to any Desired Position a Window-Shade Roller; and I do hereby declare the following to be a full, clear, and exact description of the invention, such as will enable others skilled in the art to which it appertains to make and use the same.

The invention relates to an appliance for raising, lowering, and holding window-shade rollers at any desired position.

One of the objects of the invention is the provision of means for supporting the window-shade roller and for the adjustment of the same throughout the longitudinal area of the window frame.

A further object of the invention is the provision of means for clamping window-shade rollers of any desired length.

Other objects of the invention are the provision of means simple in construction, durable, efficient in operation, and inexpensive in the manufacture.

With these and other objects in view the invention consists in the construction, combination, and arrangement of parts, as will be hereinafter referred to and as embodied in the accompanying drawings, which disclose the preferred form of the invention. However, it is to be understood that I may make such changes, variations, and modifications as come properly within the scope of the claims hereunto appended.

In the drawings, Figure 1 is a front view of the window-shade-roller appliance and window-frame. Fig. 2 is a perspective view of the shade-roller support and slidable clamps. Fig. 3 is a sectional view of one of the cord-pulleys; and Fig. 4 is a detail perspective view of the bracket for supporting the cord-pulley, the latter being detached.

Similar reference characters indicate corresponding parts throughout the several views.

In the drawings the numeral 2 designates the window-frame of the ordinary construction, the same forming no part of the invention, and secured thereto at a suitable locality approximate to the upper edge of the cross-bar of the said frame and a distance from one another are brackets 3, the latter being connected by a suitable fastening 4.

Rotatively mounted in each of the brackets 3 is a grooved pulley 5, the same having a bearing on a detachable pin 6, carried by the said bracket 3, and traveling on each of the said grooved pulleys are cords 7 and 8. The latter, however, may be in the form of wire roping, if found desirable. One extremity of each of the said cords 7 and 8 is fastened to slidable clamps 9, the latter having adjustment throughout the longitudinal extent of a strip 10, which may be of any suitable material, though preferably of wood, and also may have any desired thickness. Each of said slidable clamps 9 is provided with an opening 11 for receiving the terminals of the cords 7 and 8, so that the same may be secured thereto, and also cause the clamps 9 to bind the said strip 10, and thereby prevent longitudinal displacement of the clamps longitudinally with respect to the strip 10. Depending from each clamp is an extension 12 and 13, the former having a curved open slot 14 and the latter having an opening 15 for the purpose of receiving the extremities of a curtain-shade roller 16 of the usual type and provided with the shade 17.

Each of the cords 7 and 8 is of sufficient length to allow the curtain-shade roller 16 to be positioned normally intermediate the depth of the window-frame 2, and the other terminals thereof are connected to a ring 18, the latter having secured thereto a single cord 19, provided with a plurality of rings 20, positioned at desirable intervals throughout the length of the said single cord 19. At a suitable position on the side member of the window-frame 2 is a catch member 21, which is adapted for engagement with any one of the plurality of rings 20, so as to retain the shade-roller 16 in its desired adjusted position throughout the extent of the window-frame 2, and there may be a number of these catch members 21, if found necessary.

For adjusting or positioning the shade-roller 16 it is necessary for the operator to release any one of the plurality of rings 20, and by pulling on the single cord 19 will cause the strip 10 to be elevated and at the same time due to the positioning of the shade-roller 16 in the adjustable or slidable clamps 11 to be raised the desired height with respect to the extent or depth of the window-frame.

Having described the invention, what is claimed is—

1. In an appliance of the class described, a plurality of brackets having grooved pulleys journaled therein, a strip, clamps forming split sleeves for slidable engagement with the strip and having openings in the body thereof, depending extensions on said clamps, a shade-roller supported by said extensions, cords secured in the openings of each of said clamps and passing over the pulleys, rings on said cords, and catches on the window-frame with which said rings coöperate to hold the said roller in any position, said cords engaging the openings of the sleeve adapted to bind the same on the strip and to prevent longitudinal movement with respect to the latter.

2. In an appliance of the class described, a plurality of brackets having grooved pulleys journaled therein, a strip, slidable clamps, each of said clamps forming a split sleeve for slidable engagement with the strip and having openings in the body thereof, a shade-roller carried by the said clamps, cords secured in the openings of each of the said clamps and adapted to bind the latter on the strip and prevent longitudinal movement with respect to the strip and passing over the pulleys, means carried by the cords, and catches on the window-frame for engagement with the said means to hold the shade-roller in any position.

In testimony whereof I have hereunto set my hand before two subscribing witnesses.

WILLIAM NELSON DUNN.

Witnesses:
CHAS. E. THOMPSON,
WM. W. DOWNEY.